June 24, 1930. A. R. CURTIS 1,767,053
SUPPORTING AND DRIVING MEANS FOR GYRATORY SHAFTS
Filed April 28, 1924 2 Sheets-Sheet 1
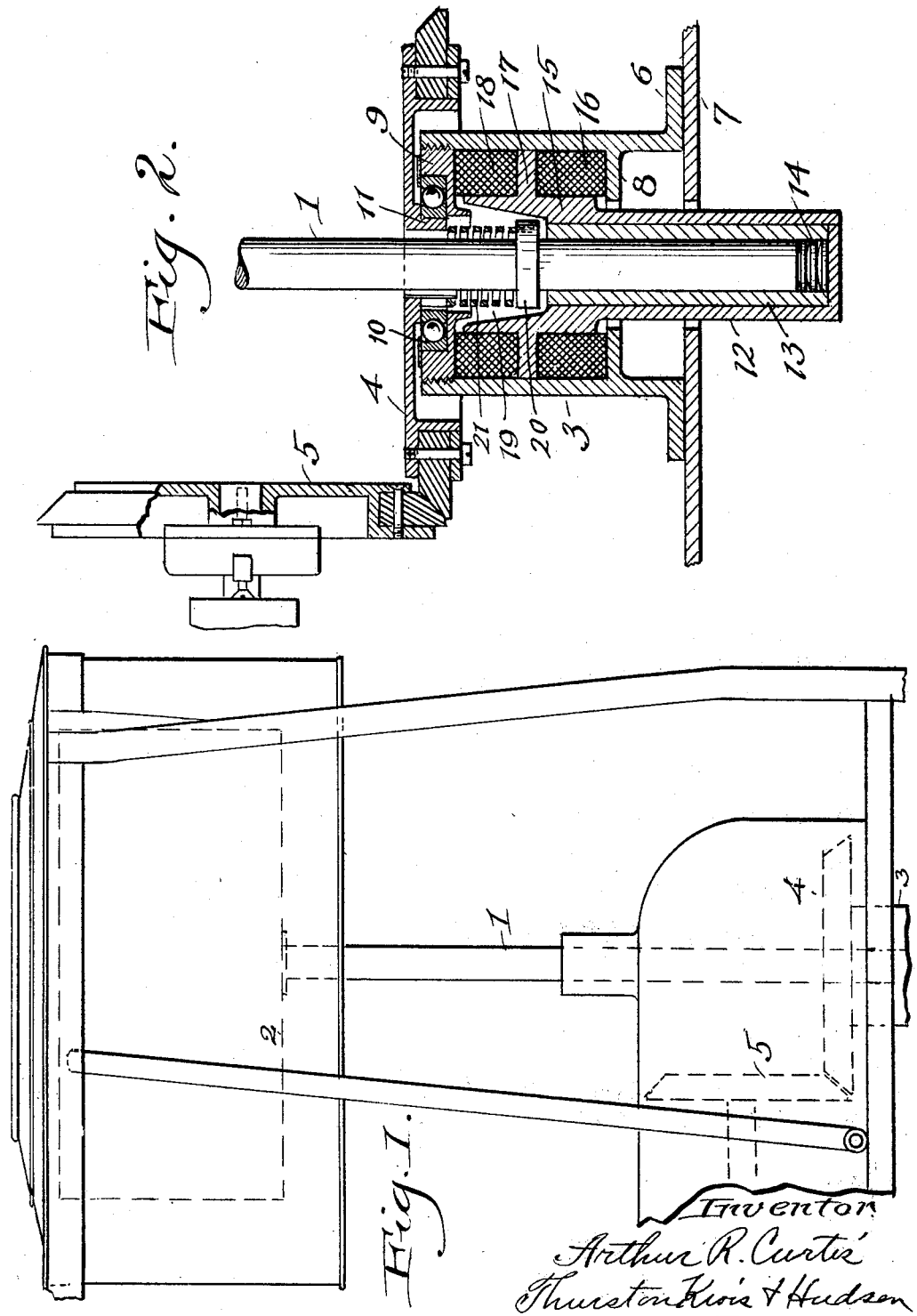

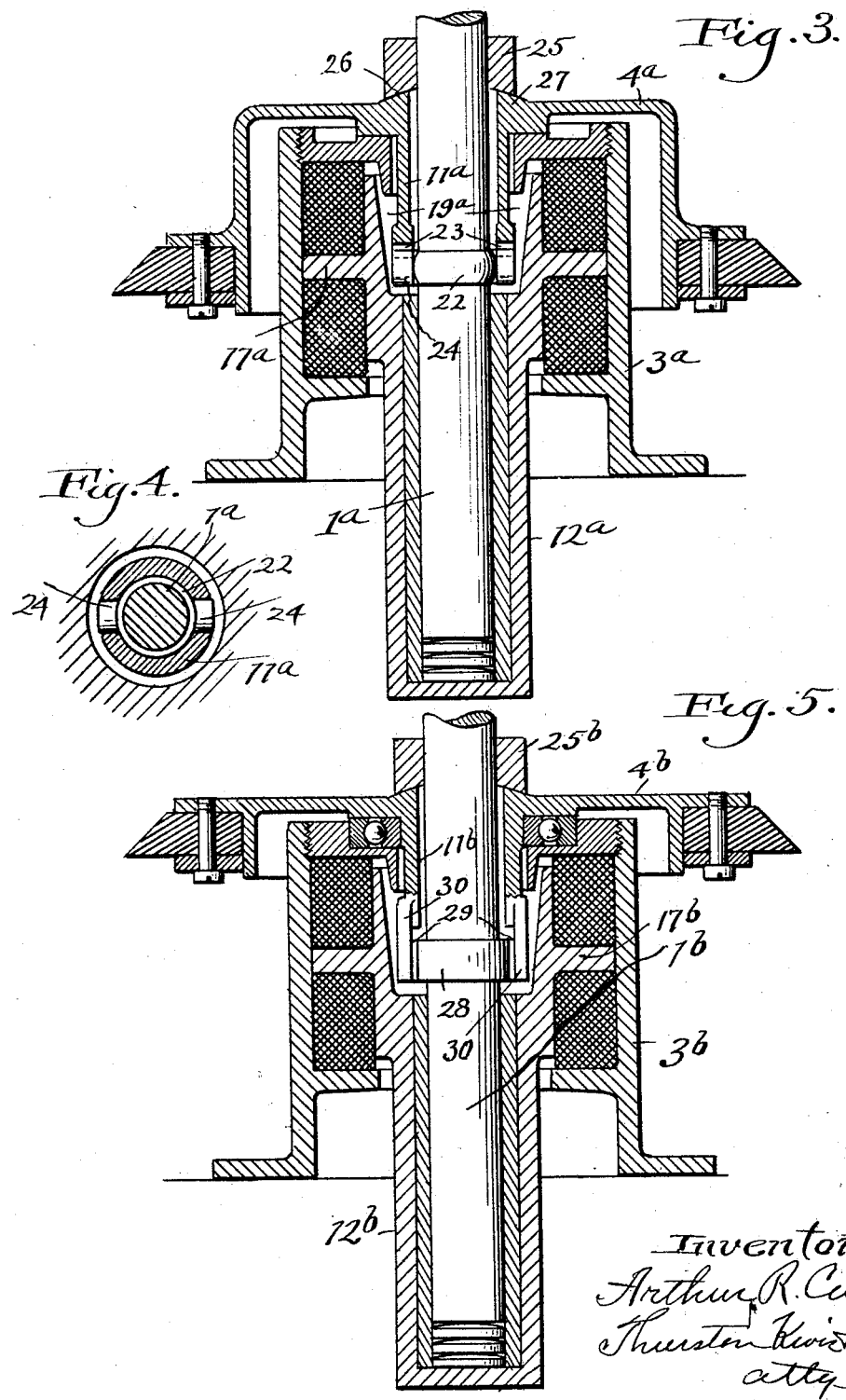

Patented June 24, 1930

1,767,053

UNITED STATES PATENT OFFICE

ARTHUR R. CURTIS, OF CLEVELAND, OHIO

SUPPORTING AND DRIVING MEANS FOR GYRATORY SHAFTS

Application filed April 28, 1924. Serial No. 709,480.

This invention relates to supporting and driving means for gyratory shafts such as employed in centrifugal extractors and has for its object to provide a mounting for the shaft in which the shaft is so supported that lateral movements thereof are yieldingly opposed, together with a simple and efficient driving connection between the gyratory shaft and a true running wheel such that the vibratory movements of the shaft will not be communicated to the driving mechanism.

With the above and other objects in view the invention may be said to comprise the modifications illustrated in the accompanying drawings, hereinafter described and particularly set forth in the appended claim, together with such variations and modifications thereof as will be apparent to one skilled in the art to which the invention appertains.

Reference should be had to the accompanying drawings forming a part of this specification in which Fig. 1 is a side elevation showing a portion of a rotary extractor, the gyratory shaft which supports the extractor basket and a portion of the supporting housing and driving mechanism for the shaft; Fig. 2 is a vertical section taken centrally through the shaft supporting housing; Fig. 3 is a vertical section corresponding to Fig. 2 showing a modified form of driving connection between the shaft and gear; Fig. 4 is a detail view showing a transverse section through the driving connection shown in Fig. 3; Fig. 5 is a vertical section showing an additional modification of the driving connection.

Referring to the accompanying drawings, the gyratory shaft 1 which supports at its upper end the extractor basket 2 is mounted at its lower end in a supporting housing 3 and is driven through a friction gear 4 which is engaged by a driving friction gear 5 operated from a suitable source of power.

The present invention resides in the mounting of the shaft 1 and in the means by which the shaft 1 is driven from the gear 4, the shaft 1 being yieldably mounted in the housing 3 and provided with a driving connection with the gear 4 which does not interfere with the gyratory movements of the shaft within the hub of the gear. The housing 3 is rigidly secured to the frame of the machine and as shown herein is provided with a base flange 6 which is secured to a base plate 7 which is a rigid part of the frame. The housing 3 which may be cylindrical in form is provided upon the interior thereof with an inwardly extending peripheral flange 8 and a top closure member 9 which is screwed into the top of the casing, the shaft supporting means being secured between the flange 8 and closure member 9 of the housing. The closure member 9 is annular in form having a central opening through which the shaft 1 extends and being provided around the central opening with a recess to receive a ball bearing 10 to the inner race ring of which is secured the downwardly projecting hub 11 of the gear 4, the hub 11 having an interior diameter somewhat greater than the diameter of the shaft 1 to permit the necessary lateral movements of the shaft. Mounted within the housing 3 is a tubular shaft supporting member 12 which is closed at its lower end and provided with a bushing 13 in the lower bearing portion thereof within which the lower end of the shaft 1 is journaled, thrust-buttons 14 being provided between the bottom of the member 12 and the lower end of the shaft to support the shaft. Above the flange 8 within the housing the supporting member 12 has an enlarged upper end portion 15 and between the lower part of the enlarged portion 15 and the wall of the housing there is fitted a rubber cushioning ring 16 which rests upon the flange 8 of the housing. The enlarged portion 15 of the supporting member is provided with an outwardly extending peripheral flange 17 which rests upon the upper edge of the cushioning ring 16 and between the flange 17 and the adjustable cover member 9 there is interposed a second cushioning ring 18 of rubber or other suitable elastic material. The shaft supporting member 12 is thus yieldingly supported in the housing 3 so that the shaft 1 may have limited lateral movements, the amount of resistance to such lateral movements being regulable by adjustment of the screw cover 9 to vary the compression of the cushioning rings.

The upper end of the shaft supporting member 12 above the bearing portion thereof has an enlarged recess 19 extending from the top thereof to slightly below the exterior flanges 17 and within the lower portion of this recess a collar 20 is fixed to the shaft. Surrounding the shaft 1 within the recess 19 is a coil spring 21 which is connected at its upper end to the hub 11 of the gear 4 and at its lower end to the collar 20. The spring 21 forms a yielding driving connection between the gear 4 and the shaft 1 and this driving connection will not interfere with the lateral movements of the shaft within the hub of the driving wheel and will not transmit vibratory movements from the shaft to the driving gear. By reason of the mounting of the shaft and the driving connection above described the driving gear 4 which rotates upon a fixed bearing will have a uniform engagement with the driving gear 5 and the operation of the driving mechanism is rendered practically noiseless.

Fig. 3 of the drawing shows a modification of the means for driving the shaft and in this modification the shaft 1$^a$ is mounted within the housing 3$^a$ in substantially the same manner as in the first modification, the driving gear 4$^a$ being mounted upon the housing in substantially the same manner except that the ball bearing is omitted. In this modification the gear 4$^a$ has a hub 11$^a$ which extends downwardly into the recess 19$^a$ at the upper end of the shaft supporting member. In the plane of the supporting flange 17$^a$ of the shaft supporting member 12$^a$, the shaft 1$^a$ is provided with an integral circumferential rib 22 with a spherical outer surface, the center of which is at the axis of the shaft. This rounded rib 22 fits within the tubular hub 11$^a$ so that the shaft in its lateral movements is caused to oscillate about the center of curvature of the rib 22 locating the center of gyration at the intersection of the axis of the shaft and the central plane of the rib. At its lower end the hub 11$^a$ is provided with diametrically opposed slots 23 in which are engaged cylindrical lugs 24 which are fixed to the shaft. In operation the rotary movement of the gear 4$^a$ is transmitted to the shaft 1$^a$ through the lugs 24 which always engage with the edges of the slots 23 at points lying in a plane passing through the center of oscillation of the shaft. For retaining the shaft in proper position within the supporting member 12$^a$ a collar 25 is fixed to the shaft above the gear 4$^a$ and this collar has a spherical concave bearing surface 26 on its underside which is engaged by a raised spherical bearing surface 27 at the hub of the gear. The spherical bearing surfaces 26 and 27 have their center at the center of oscillation of the shaft so that the shaft is permitted to oscillate freely within the hub.

In the modification shown in Fig. 5 the housing 3$^b$, gear 4$^b$ and the mounting of the shaft supporting member 12$^b$ within the housing is substantially the same as in the modification first described. In this modification the hub 11$^b$ of the gear 4$^b$ projects inwardly into the recess 17$^b$ at the upper end of the supporting member 12$^b$ and within the recess 17$^b$ and substantially in the same plane as the flanges 17$^b$ of the supporting member, the shaft 1 has fixed thereto a collar 28 which has diametrically opposed vertical slots 29 extending inwardly from the periphery thereof. The lower end of the hub 11$^b$ is provided with downwardly projecting lugs 30 which engage in the slots 29 of the collar 28. The lugs 30 engaging in the slots 29 provide a driving connection between the gear 4$^b$ and shaft 1$^b$ which is substantially in the plane of the center of oscillation of the shaft. A collar 25$^b$ corresponding to the collar 25 above described may be provided for holding the shaft in proper position in its support.

Having described my invention, I claim:

In a device of the character described, the combination with a vertical shaft, of a supporting member at the lower end of said shaft in which said shaft is rotatably mounted, means for yieldably supporting said member to permit the shaft to gyrate, said supporting member having a lower bearing portion in which the shaft is journaled and an enlarged tubular portion surrounding the shaft above the bearing portion, a fixed bearing surrounding the shaft above said supporting member, a driving member having a hub rotatable in the fixed bearing and an axial opening through which the shaft extends and within which the shaft is free to gyrate, and means within the enlarged upper portion of the supporting member forming a driving connection between said hub and shaft, said driving connection permitting lateral movement of the shaft within the hub.

In testimony whereof, I hereunto affix my signature.

ARTHUR R. CURTIS.